United States Patent
Heitkamp et al.

(10) Patent No.: US 8,085,484 B2
(45) Date of Patent: Dec. 27, 2011

(54) FLIP OPTIC ADAPTOR

(75) Inventors: Ryan Joseph Heitkamp, West Chester, OH (US); Eugene Franklin Horn, Beavercreek, OH (US); Michael Jason Kratoska, Beavercreek, OH (US); Jonathan Schoen Willson, Ansonia, OH (US)

(73) Assignee: Sensor Technology Systems, Inc., Beavercreek, OH (US)

( * ) Notice: Subject to any disclaimer, the term of this patent is extended or adjusted under 35 U.S.C. 154(b) by 242 days.

(21) Appl. No.: 12/655,331

(22) Filed: Dec. 29, 2009

(65) Prior Publication Data
US 2011/0157713 A1    Jun. 30, 2011

(51) Int. Cl.
*G02B 27/10* (2006.01)
(52) U.S. Cl. ........................................ 359/827
(58) Field of Classification Search .................. 359/827, 359/828, 817, 819
See application file for complete search history.

(56) References Cited

U.S. PATENT DOCUMENTS

| | | | |
|---|---|---|---|
| 5,617,257 A | 4/1997 | Sheehy et al. | |
| 5,760,953 A | 6/1998 | Task et al. | |
| 5,898,522 A * | 4/1999 | Herpst | 359/819 |
| 6,992,275 B1 | 1/2006 | Knapp | |

OTHER PUBLICATIONS

Butler Creek, Blizzard Scope Covers, 2007, USA, http://www.butlercreek/products/scopes_blizzard.html.

* cited by examiner

*Primary Examiner* — Alicia M Harrington
(74) *Attorney, Agent, or Firm* — Taft Stettinius & Hollister LLP (57) ABSTRACT

Attachments for adjusting optical properties of image forming optical systems. An example refocus flip optic adaptor for a night vision goggle may include an adaptor housing for detachably mounting to an objective lens assembly of the night vision goggle and an optical element holder pivotably mounted to the adaptor housing such that a refocus lens (or other optical element) mounted to the optical element holder is selectively positionable in an operative position in which the refocus lens is axially aligned with the objective lens of the night vision goggle and an inoperative position in which the refocus lens and the optical element holder do not affect an image viewable through the night vision goggle. In some example embodiments, the optical element viewing diameter may be substantially the same as objective lens viewing diameter. Example optical elements may affect optical properties such as objective lens focus, optical filtering, and magnification.

20 Claims, 8 Drawing Sheets

FLIP OPTIC ADAPTOR

BACKGROUND

The present disclosure relates generally to image forming optical systems, such as night vision devices, and, more particularly, to attachments for adjusting optical properties of image forming optical systems.

U.S. Pat. No. 5,760,953 discloses an adaptor for night vision goggles and U.S. Pat. No. 5,617,257 discloses a variable focus adaptor for night vision goggles, and both are incorporated by reference.

SUMMARY

The present disclosure includes attachments for adjusting optical properties of image forming optical systems. An example refocus flip optic adaptor for a night vision goggle may include an adaptor housing for detachably mounting to an objective lens assembly of the night vision goggle and an optical element holder pivotably mounted to the adaptor housing such that a refocus lens (or other optical element) mounted to the optical element holder is selectively positionable in an operative position in which the refocus lens is axially aligned with the objective lens of the night vision goggle and an inoperative position in which the refocus lens and the optical element holder do not affect an image viewable through the night vision goggle. In some example embodiments, the optical element viewing diameter may be substantially the same as objective lens viewing diameter. Example optical elements may affect optical properties such as objective lens focus, optical filtering, and magnification.

In an aspect, an optic adaptor for an image forming optical system may include an adaptor housing for detachably mounting to an objective lens assembly of an image forming optical system, the objective lens assembly including an objective lens having an objective lens viewing diameter; and an optical element holder pivotably mounted to the adaptor housing such that an optical element mounted to the optical element holder is manually repositionable between an operative position in which the optical element is axially aligned with the objective lens of the image forming optical system and an inoperative position in which the optical element and the optical element holder do not affect an image viewable through the image forming optical system. The optical element may have an optical element viewing diameter, and the optical element viewing diameter may be substantially the same as the objective lens viewing diameter.

In a detailed embodiment, the optical element holder may be configured to be pivoted between the operative position and the inoperative position using one hand. In a detailed embodiment, the optical element holder may include at least one tab extending therefrom for pivoting the optical element holder relative to the housing.

In a detailed embodiment, the adaptor housing may include a split section for receiving at least a portion of the objective lens assembly therein, and the split section may include at least two elastically deformable at least partially overlapping segments which may be moved relative to each other such that a diameter of the adaptor housing increases. In a detailed embodiment, each of the overlapping segments may include a tab extending therefrom.

In a detailed embodiment, the adaptor housing may include a locking ring including a tightening screw configured to adjust a diameter of the locking ring. In a detailed embodiment, the optical element includes a refocus lens; and wherein, when the optical element holder is in the operative position, the refocus lens substantially decreases a distance at which an image may be clearly viewed through the image forming optical system.

In a detailed embodiment, the optical element may include a spectrally selective filter. In a detailed embodiment, the optical element may include an input light intensity reducing filter. In a detailed embodiment, the optical element may include a magnification lens and, when the optical element holder is in the operative position, the magnification lens may magnify an image viewable through the image forming optical system. In a detailed embodiment, the optical element may include a wide-angle lens. In a detailed embodiment, the wide-angle lens may include a fisheye lens. In a detailed embodiment, the optical element may include a protective window.

In an aspect, a refocus adaptor for an image forming optical system may include an adaptor housing for releasably mounting to an objective lens assembly of an image forming optical system, the objective lens assembly including an objective lens having an objective lens viewing diameter, and the adaptor housing including a split section for receiving at least a portion of the objective lens assembly therein, the split section including at least two at least partially overlapping segments which may be elastically deformed to temporarily vary a diameter of the adaptor housing; and a refocus lens holder pivotably mounted to the adaptor housing such that a refocus lens mounted to the refocus lens holder is selectively positionable between an operative position in which the refocus lens is axially aligned with the objective lens of the image forming optical system such that a distance at which an image may be clearly viewed through the image forming optical system is substantially decreased and an inoperative position in which the refocus lens and the refocus lens holder do not affect the image viewed through the image forming optical system. The refocus lens may have a refocus lens viewing diameter, and the refocus lens viewing diameter may be substantially the same as objective lens viewing diameter.

In a detailed embodiment, the refocus lens holder may include at least one tab extending therefrom for pivoting the refocus lens holder relative to the housing. In a detailed embodiment, each of the overlapping segments may include a tab extending therefrom. In a detailed embodiment, the adaptor housing may be releasably mountable to the objective lens assembly by a friction fit.

In an aspect, a method of using an image forming optical system may include installing a flip optic adaptor onto an objective lens assembly of an image forming optical system by elastically deforming a split section of an adaptor housing to increase a diameter of the adaptor housing, receiving at least a portion of the objective lens assembly in the adaptor housing, and engaging the portion of the objective lens assembly with the adaptor housing to cause a friction fit; placing an optical element into an operative position by pivoting an optical element holder to which the optical element is mounted and which is pivotably coupled to the adaptor housing such that the optical element is axially aligned with an objective lens of the objective lens assembly; and placing the optical element into an inoperative position by pivoting the optical element holder such that the optical element and the optical element holder do not affect an image viewable through the image forming optical system.

In a detailed embodiment, the operations of placing the optical element into the operative position and placing the optical element into the inoperative position may be performed using one hand.

In a detailed embodiment, the optical element may include a refocus lens configured such that, when the optical element holder is in the operative position, the refocus lens substantially decreases a distance at which the image may be clearly viewed through the image forming optical system. A method may include, after the operation of placing the optical element into the operative position, viewing an object at a near distance and, after the operation of placing the optical element into the inoperative position, viewing an object at a far distance.

BRIEF DESCRIPTION OF THE DRAWINGS

The detailed description refers to the following figures in which.

DETAILED DESCRIPTION

The present disclosure includes, inter alia, attachments for adjusting optical properties of image forming optical systems. For example, a refocus flip optic adaptor according to the present disclosure may include an adaptor housing for detachably mounting to an objective lens assembly of a night vision goggle and an optical element holder pivotably mounted to the adaptor housing such that a refocus lens (or other optical element) mounted to the optical element holder is selectively positionable in an operative position in which the refocus lens is axially aligned with the objective lens of the night vision goggle. Other example optical elements may provide other optical alterations such as, without limitation, optical filtering and/or magnification.

The present disclosure contemplates that night vision goggles and similar image forming optical systems have been widely used by military personnel and civilians to enhance vision or viewing in a variety of conditions. A device providing a quick change in an optical property of a night vision device may be particularly useful for military or law enforcement users because these users may conduct highly dynamic and/or high mobility activities in conditions of low illumination levels. In some circumstances, the ability to quickly change an optical property of an image forming optical system may increase an operator's overall effectiveness.

The present disclosure contemplates that, in many situations, a user may benefit from viewing objects at a distance as well as objects located near to the user. Conventional night vision devices may include an objective lens focusing mechanism. Such a mechanism may include a manually rotatable adjustment ring for axially displacing the objective lens or assembly in and out to focus on far and near objects.

The present disclosure contemplates that, in some circumstances, the user of a night vision device may frequently switch back and forth between viewing far and near (e.g., about 20-24 inches, such as for viewing a map). With conventional night vision device focusing mechanisms, frequent refocusing may be difficult, arduous, and time consuming because each refocusing operation may require adjusting the objective lens to the precise axial location necessary to obtain best focus. Further, these problems may be compounded in binocular night vision goggles because the manual focus adjustments must be made on both oculars if full binocular capability is to be maintained.

The present disclosure contemplates that some image devices have attempted to improve the problems associated with frequent refocusing by quickly adjusting the objective lens focus through the use of a close-up lens that has an effective diameter substantially smaller than the diameter of the objective lens of the image forming optical system. Such a smaller-diameter close-up lens may raise the f-number of the objective lens/close-up lens combination, which may increase the depth of focus and enhance near viewing. A problem associated with such a device is that the smaller diameter lens (which may include a relatively smaller aperture) may substantially decrease the amount of light that enters the objective lens of the night vision device, which may reduce the imaging ability of the night vision device.

The present disclosure contemplates that another problem associated with a smaller-diameter close-up lens is that the device typically requires auxiliary illumination due to the increase in the overall system f-number. Low light observation operations frequently subject the user to situations in which auxiliary illumination is not feasible or may be detrimental. In addition, auxiliary illumination may require the addition of power, in the form of a battery, to power the illumination source. Additional batteries may create logistical issues and may add weight and size to the system.

The present disclosure contemplates that, in some situations, a user may desire to quickly adjust another optical property of a night vision device. For example it may be desirable to quickly enhance the contrast of the image by using a filter that is spectrally selective. In some circumstances, a user may wish to frequently switch back and forth between the standard night vision scene and one where the scene is spectrally selected to improve the contrast and identify specific objects. For example and without limitation, a user may wish to improve the visibility of spectrally reflective clothing, TTL (tagging, tracking, and locating) beacons, and/or IFF (identification, friend or foe) beacons. Also, for example, a user may utilize a spectrally selective filter for protection from certain laser devices.

Accordingly, some example embodiments according to the present disclosure may include an adaptor device for quick and easy adjustment of the optical properties of a night vision device or similar image forming optical system. Some example embodiments may provide full, high-quality near and distant imagery without compromising the fundamental objective for obtaining night vision under the lowest possible conditions of ambient illumination. Some example embodiments may include an adaptor that is passive in operation and minimizes the overall system. In some example embodiments, an adaptor device may be readily attachable to an ocular and/or objective lens assembly of night vision device.

Figure 1:
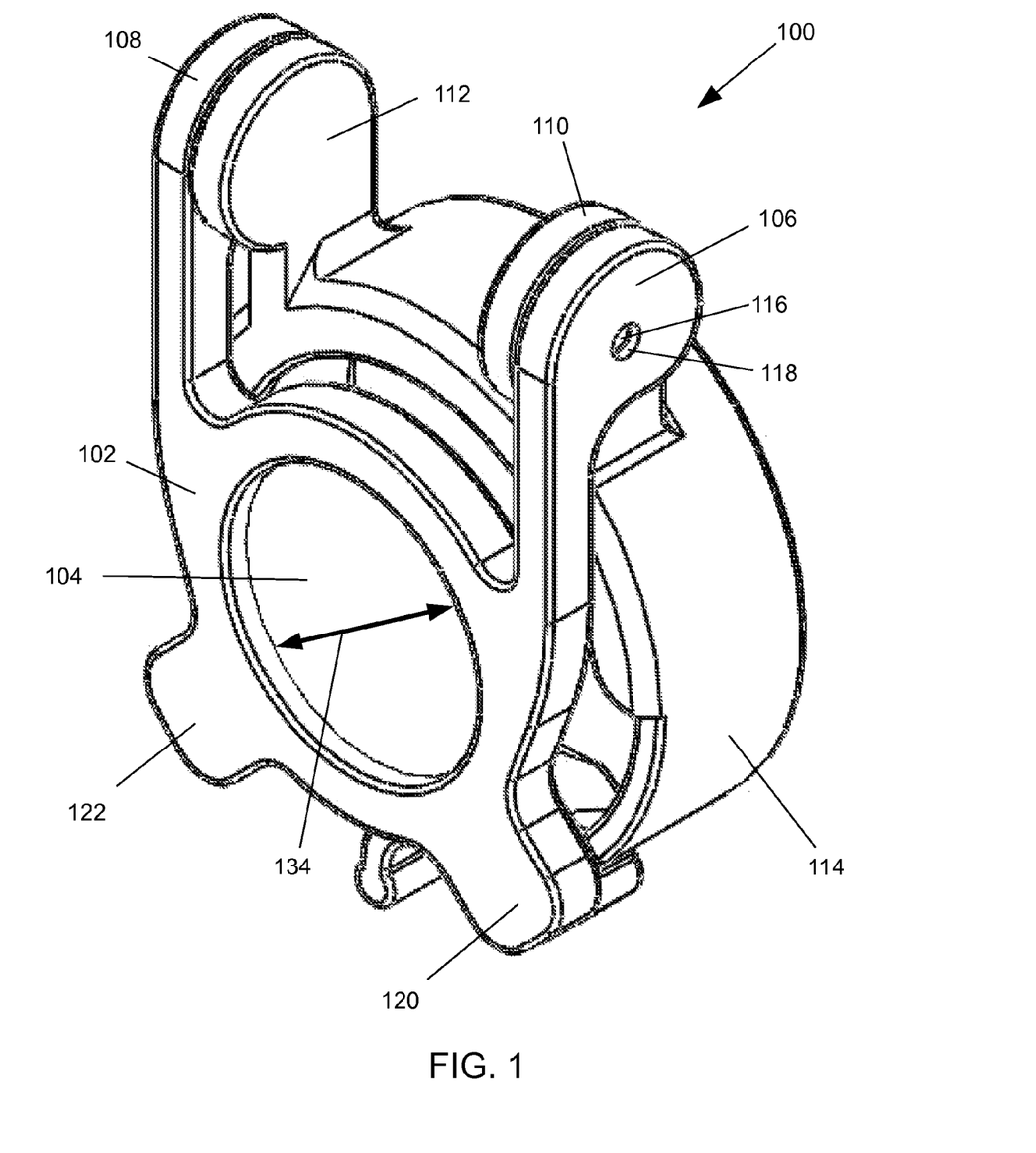
FIG. 1 is a perspective view of an example flip optic adaptor.
Figure 2:
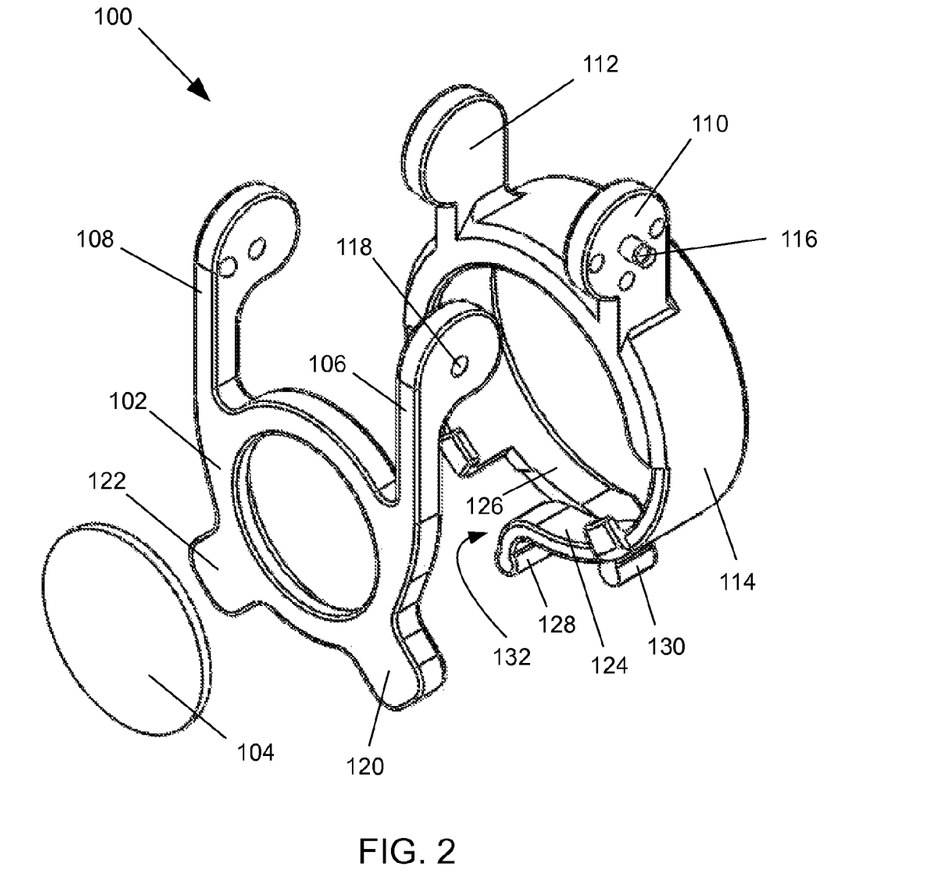
FIG. 2 is an exploded view of an example flip optic adaptor.

FIGS. 1 and 2 illustrate an example flip optic adaptor 100, which may include an optical element holder 102 and/or an optical element, such as lens 104. Optical element holder 102 may include one or more upwardly extending pivoting arms 106, 108, which may pivotably engage corresponding fixed arms 110, 112 of adaptor housing 114. For example, fixed arm 110 may include a pivot 116 which may be rotatably received in an opening 118 in pivoting arm 106, and pivoting arm 108 and fixed arm 112 may include a similar structure. In some example embodiments, optical element holder 102 may include one or more tabs 120, 122, which may be grasped by a user to pivot optical element holder 102 relative to adaptor housing 114.

In some example embodiments, adaptor housing 114 may include a hose-clamp-type interface. For example, such a hose-clamp-type interface may include a split section 132, which may include overlapping segments 124, 126 (which may partially or fully overlap). Individual segments 124, 126 may include tabs 128, 130, respectively, which may be squeezed together by a user to move segments 124, 126 relative to each other. Squeezing tabs 128, 130 may cause segments 124, 126 to move relative to each other such that the diameter of adaptor housing 114 increases. In some example embodiments, adaptor housing 114 may be constructed of an elastically deformable material such that releasing tabs 128, 130 may allow adaptor housing 114 to return to its original diameter.

Figure 3:
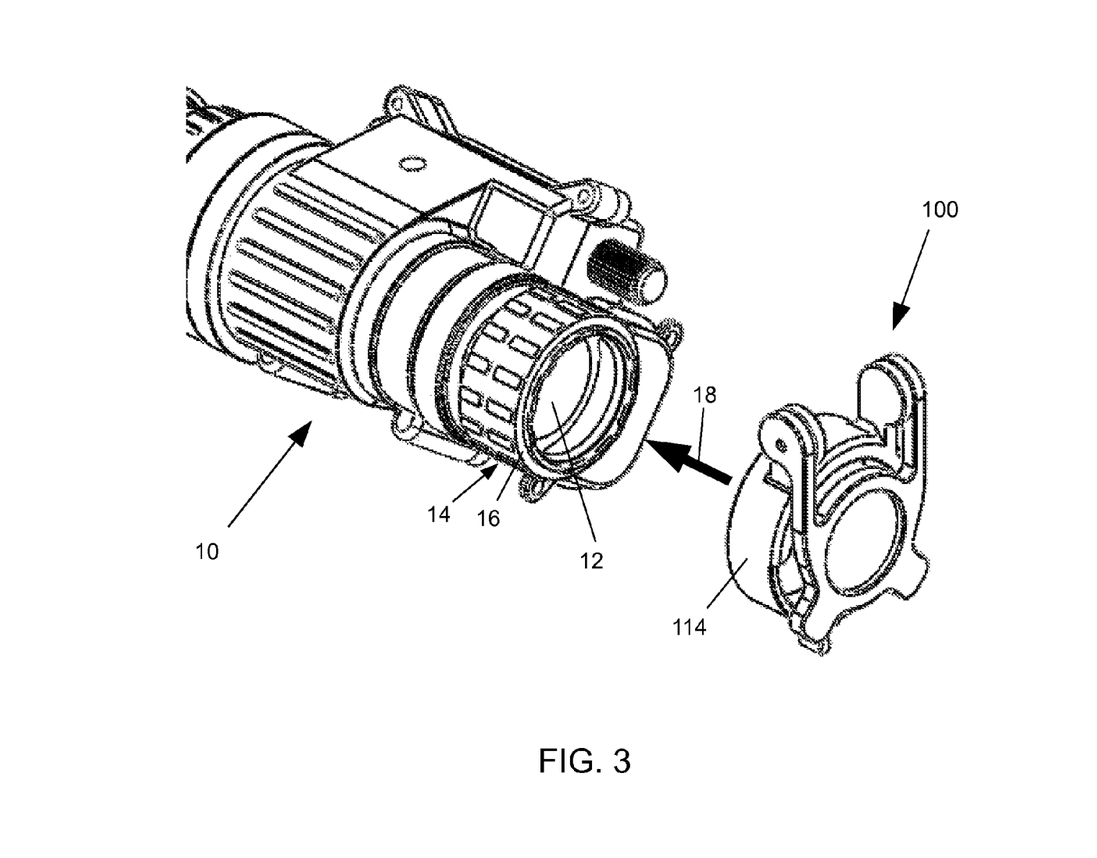
FIG. 3 is a perspective view of an example flip optic adaptor being installed on a night vision goggle.

FIG. 3 illustrates installation of an example flip optic adaptor 100 onto an image forming optical system, such as a night vision goggle (NVG) 10. NVG 10 may include, among other things, an objective lens 12 which may be mounted within an objective lens assembly 14 near an entrance portion 16. In some example embodiments, flip optic adaptor 100 may be installed on NVG 10 by moving flip optic adaptor 100 generally in the direction of arrow 18 such that adaptor housing 114 engages entrance portion 16 of objective lens assembly 14. Tabs 128, 130 may be squeezed together to increase the diameter of adaptor housing 114 as adaptor housing 114 receives entrance portion 16 of objective lens assembly 14. Once adaptor housing 114 is in the desired position on objective lens assembly 14, tabs 128 130 may be released, which may allow adaptor housing 114 to tighten on objective lens assembly 14. Adaptor housing 114 may be retained on objected lens assembly 14 by a friction fit.

Other image forming optical systems which may be used in connection with example flip optic adaptors according to the present disclosure may include, without limitation, scopes (such as spotting scopes, target designators, and/or firearm scopes), binoculars, cameras, video recorders, and/or any other monocular or binocular imaging and/or viewing devices.

Figure 4:
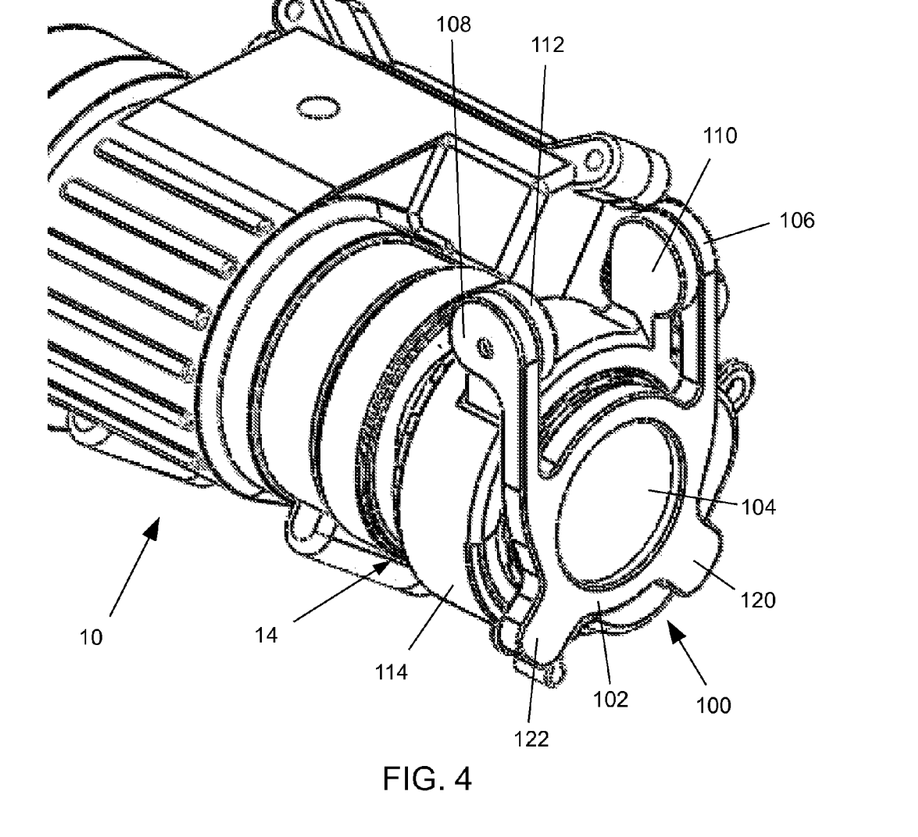
FIG. 4 is a perspective view of an example flip optic adaptor installed on a night vision goggle with the lens holder in an operative position.
Figure 5:
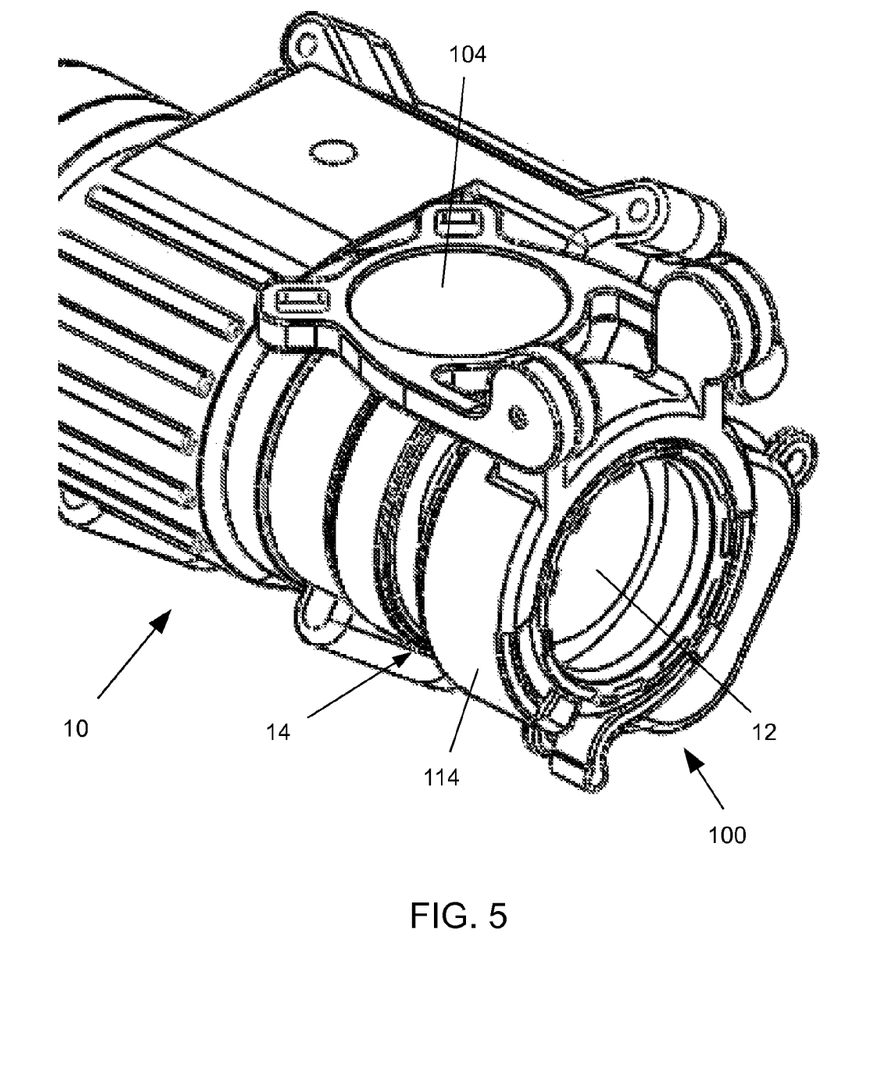
FIG. 5 is a perspective view of an example flip optic adaptor installed on a night vision goggle with the lens holder in an inoperative position.

FIGS. 4 and 5 illustrate an example flip optic adaptor 100 installed on a NVG 10. FIG. 4 illustrates optical element holder 102 in an operative position, where lens 104 is in the optical path of NVG 10 on the objective side of objective lens 12. In the operative position of FIG. 4, lens 104 may affect an image viewable through NVG 10. In the operative position, lens 104 may be axially aligned with objection lens 12 of NVG 10.

In some example embodiments, NVG 10 may be configured for viewing objects at a far distance of about tens to hundreds of feet. Lens 104 may include a refocus lens configured such that, in the operative position, an object may be clearly viewed at a near distance, such as 1-3 feet. In some example embodiments, an object may be viewed at a near distance of 20-24 inches when lens 104 is in the operative position.

FIG. 5 illustrates optical element holder 102 in an inoperative position (also referred to as a stowed position), where lens 104 is removed from the optical path of NVG 104. In the inoperative position of FIG. 5, lens 104 may not affect an image viewable through NVG 10. A user may quickly reposition optical element holder 102 between the operative and inoperative positions using tabs 120, 122. In some example embodiments, tabs 120, 122 may be sized such that a user wearing gloves may easily reposition optical element holder 102 between the operative an inoperative positions.

In some example embodiments, a viewing diameter 134 of an optical element, such as optical element 104, may be substantially the same as a viewing diameter of an objective lens of an image forming optical system, such as objective lens 104 of NVG 10.

An example embodiment may be utilized as follows. A user, such as a military person, may attach a flip optic adaptor 100 to a NVG 10 as described above. Optical element holder 102 may be left in the stowed position for normal operation of the night vision device. When image modification is desired or necessary, such as for viewing objects at near distance for example, the user may simply flips optical element holder 102 downwardly into its operative position.

Figure 6:
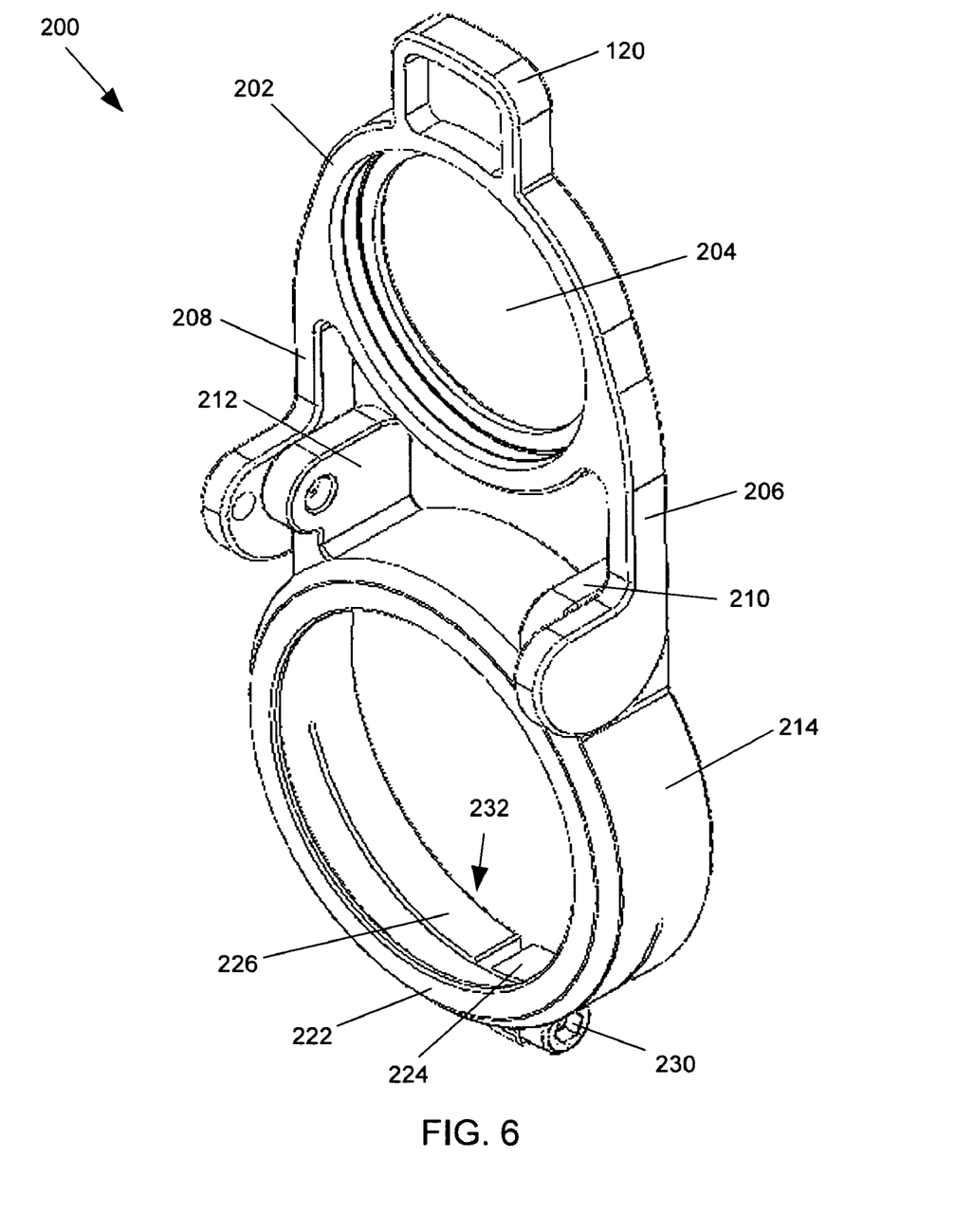
FIG. 6 is a perspective view of an example flip optic adaptor including an example screw-type-clamp.
Figure 7:
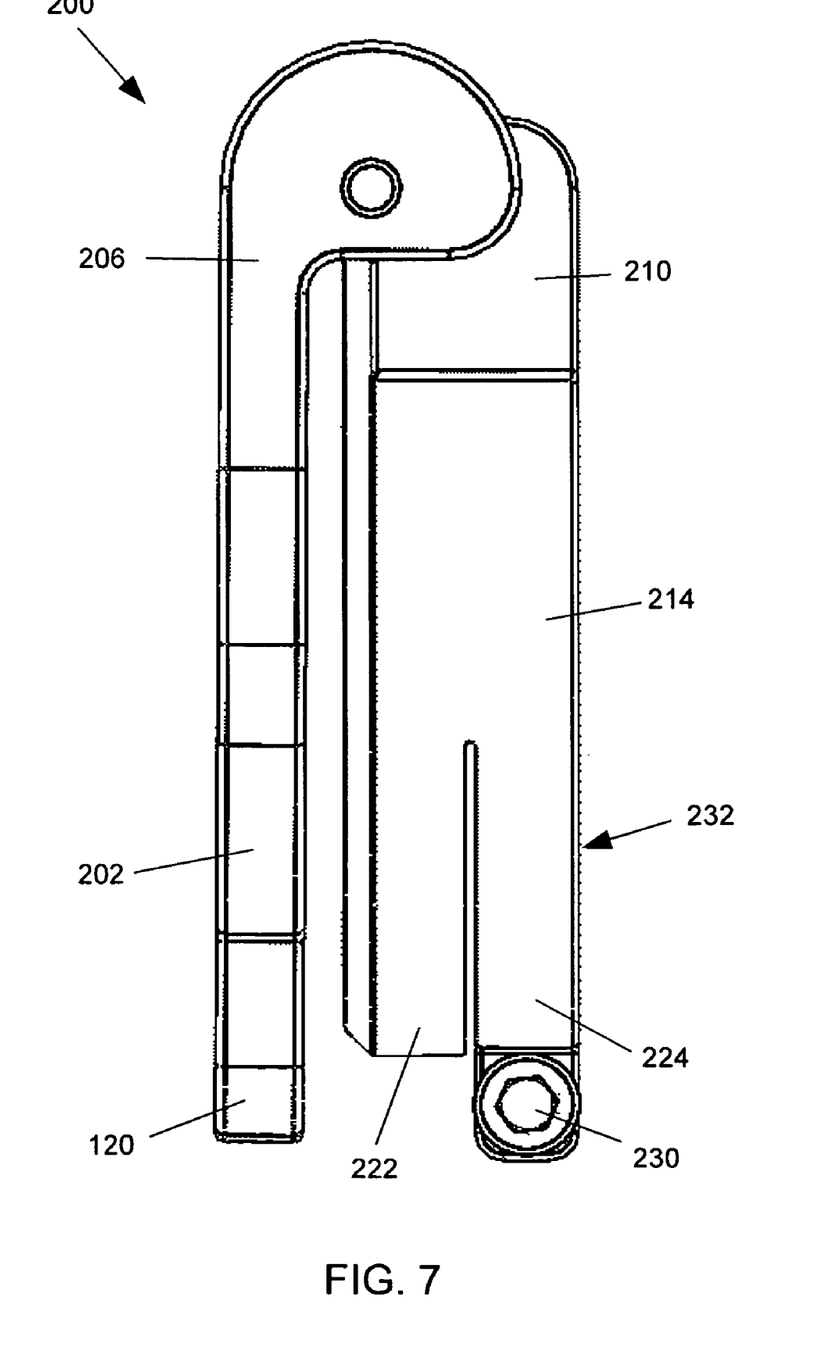
FIG. 7 is a side view of an example flip optic adaptor including an example screw-type-clamp.

FIGS. 6 and 7 illustrate an example flip optic adaptor 200 which may include an adaptor housing 214 with a screw-clamp-type interface such as a screw down, locking opening, which may be installed onto entrance portion 16 of objective lens assembly 14 of NVG 10. Flip optic adaptor 200 may include an optical element holder 202 and/or an optical element, such as lens 204. Optical element holder 202 may include one or more pivoting arms 206, 208, which may pivotably engage corresponding fixed arms 210, 212 of adaptor housing 214. In some example embodiments, optical element holder 202 may include one or more tabs 220, which may be grasped by a user to pivot optical element holder 202 relative to adaptor housing 214.

In some example embodiments, adaptor housing 214 may include a screw-clamp-type interface. For example, such a screw-clamp-type interface may include an outer ring section 222, which may be substantially continuous. An inner locking ring section 232 may be divided into two abutting segments 224, 226. Segments 224, 226 may be connected by a tightening screw 230, which may be operable to pull segments 224, 226 together to reduce the diameter of adaptor housing 214. Adaptor housing 214 may be constructed of an elastically deformable material such that its diameter may be adjusted using tightening screw 230 as desired to allow adaptor housing 214 to be installed on and/or removed from of adaptor housing 214 on objective lens assembly 14 of NVG 10, for example.

Figure 8:
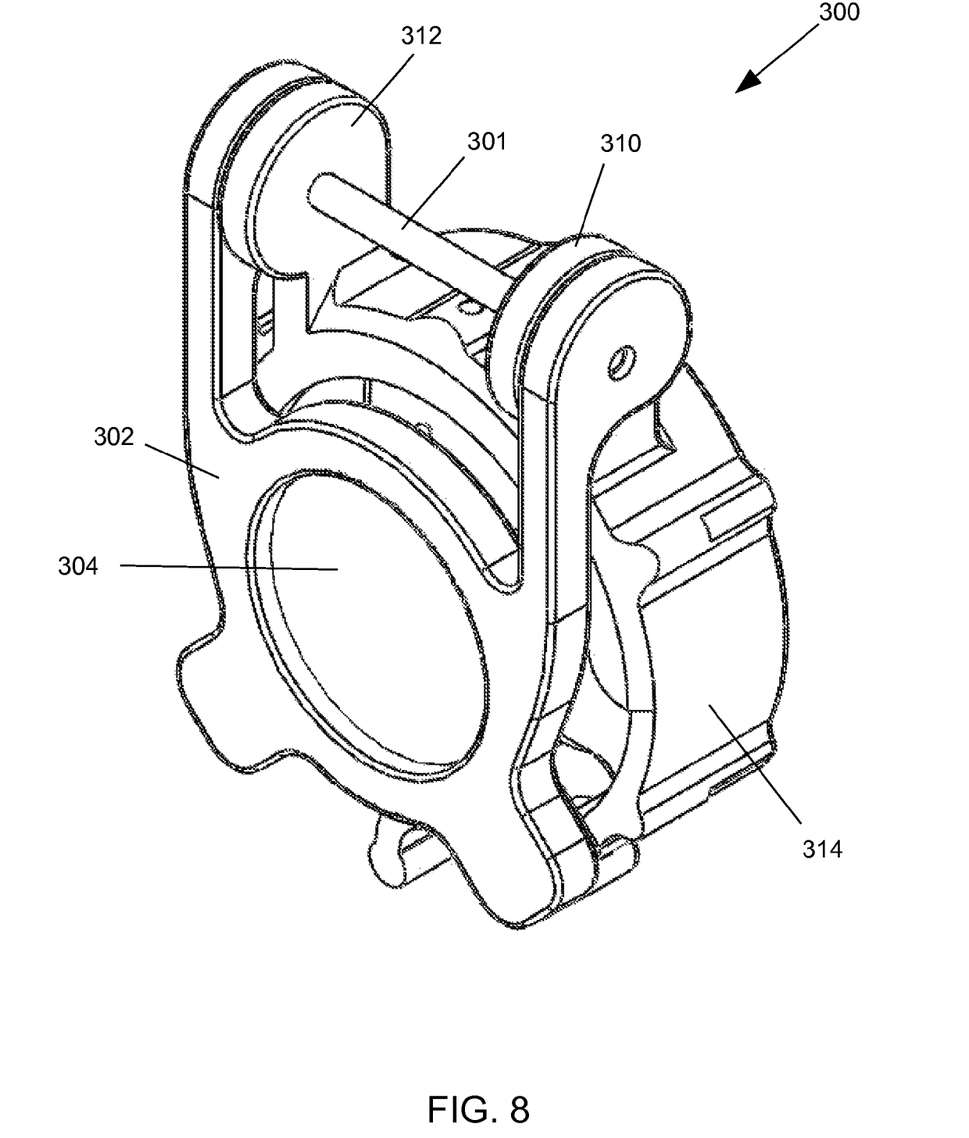
FIG. 8 is a perspective view of an example flip optic adaptor including a stiffener, all in accordance with at least some aspects of the present disclosure.

FIG. 8 illustrates an example flip optic adaptor 300 which may include a stiffener 301 extending between fixed arms 310, 312. Stiffener 301 may reduce deflection of fixed arms 310, 312 as optical element holder 302 including lens 304 is pivoted relative to adaptor housing 314. Flip optic adaptor 300 may include features similar to those described in connection with flip optic adaptors 100, 200, and flip optic adaptors 100, 200 described herein may include stiffeners similar to stiffener 301.

In some example embodiments, optical elements which may be employed in place of or in addition to lenses 104, 204, 304 may include a refocus lens which significantly decreases the distance at which an image can be clearly viewed, a spectrally selective filter, a light intensity reducing filter, a wide angle lens or "fisheye" lens providing field of view enhancement, and/or a protective and/or sacrificial window.

While example embodiments have been set forth above for the purpose of disclosure, modifications of the disclosed embodiments as well as other embodiments thereof may occur to those skilled in the art. Accordingly, it is to be understood that the disclosure is not limited to the above precise embodiments and that changes may be made without departing from the scope. Likewise, it is to be understood that it is not necessary to meet any or all of the stated advantages or objects disclosed herein to fall within the scope of the disclosure, since inherent and/or unforeseen advantages may exist even though they may not have been explicitly discussed herein.

What is claimed is:

1. An optic adaptor for an image forming optical system, the optic adaptor comprising:
   an adaptor housing for detachably mounting to an objective lens assembly of an image forming optical system, the objective lens assembly including an objective lens having an objective lens viewing diameter; and
   an optical element holder pivotably mounted to the adaptor housing such that an optical element mounted to the optical element holder is manually repositionable between an operative position in which the optical element is axially aligned with the objective lens of the image forming optical system and an inoperative position in which the optical element and the optical element holder do not affect an image viewable through the image forming optical system;
   wherein the optical element has an optical element viewing diameter; and
   wherein the optical element viewing diameter is substantially the same as the objective lens viewing diameter.

2. The optic adaptor of claim 1, wherein the optical element holder is configured to be pivoted between the operative position and the inoperative position using one hand.

3. The optic adaptor of claim 2, wherein the optical element holder includes at least one tab extending therefrom for pivoting the optical element holder relative to the housing.

4. The optic adaptor of claim 1, wherein the adaptor housing includes a split section for receiving at least a portion of the objective lens assembly therein; wherein the split section includes at least two elastically deformable at least partially overlapping segments which may be moved relative to each other such that a diameter of the adaptor housing increases.

5. The optic adaptor of claim 4, wherein each of the overlapping segments includes a tab extending therefrom.

6. The optic adaptor of claim 1, wherein the adaptor housing includes a locking ring including a tightening screw configured to adjust a diameter of the locking ring.

7. The optic adaptor of claim 1, wherein the optical element includes a refocus lens; and wherein, when the optical element holder is in the operative position, the refocus lens substantially decreases a distance at which an image may be clearly viewed through the image forming optical system.

8. The optic adaptor of claim 1, wherein the optical element includes a spectrally selective filter.

9. The optic adaptor of claim 1, wherein the optical element includes an input light intensity reducing filter.

10. The optic adaptor of claim 1, wherein the optical element includes a magnification lens; and wherein, when the optical element holder is in the operative position, the magnification lens magnifies an image viewable through the image forming optical system.

11. The optic adaptor of claim 1, wherein the optical element includes a wide-angle lens.

12. The optic adaptor of claim 11, wherein the wide-angle lens includes a fisheye lens.

13. The optic adaptor of claim 1, wherein the optical element includes a protective window.

14. A refocus adaptor for an image forming optical system, the refocus adaptor comprising:
   an adaptor housing for releasably mounting to an objective lens assembly of an image forming optical system, the objective lens assembly including an objective lens having an objective lens viewing diameter, and the adaptor housing including a split section for receiving at least a portion of the objective lens assembly therein, the split section including at least two at least partially overlapping segments which may be elastically deformed to temporarily vary a diameter of the adaptor housing; and
   a refocus lens holder pivotably mounted to the adaptor housing such that a refocus lens mounted to the refocus lens holder is selectively positionable between an operative position in which the refocus lens is axially aligned with the objective lens of the image forming optical system such that a distance at which an image may be clearly viewed through the image forming optical system is substantially decreased and an inoperative position in which the refocus lens and the refocus lens holder do not affect the image viewed through the image forming optical system; wherein the refocus lens has a refocus lens viewing diameter; and
   wherein the refocus lens viewing diameter is substantially the same as objective lens viewing diameter.

15. The refocus adaptor of claim 14, wherein the refocus lens holder includes at least one tab extending therefrom for pivoting the refocus lens holder relative to the housing.

16. The refocus adaptor of claim 14, wherein each of the overlapping segments includes a tab extending therefrom.

17. The refocus adaptor of claim 14, wherein the adaptor housing is releasably mountable to the objective lens assembly by a friction fit.

18. A method of using an image forming optical system, the method comprising:
   installing a flip optic adaptor onto an objective lens assembly of an image forming optical system by elastically deforming a split section of an adaptor housing to increase a diameter of the adaptor housing, receiving at least a portion of the objective lens assembly in the adaptor housing, and engaging the portion of the objective lens assembly with the adaptor housing to cause a friction fit;
   placing an optical element into an operative position by pivoting an optical element holder to which the optical element is mounted and which is pivotably coupled to the adaptor housing such that the optical element is axially aligned with an objective lens of the objective lens assembly; and
   placing the optical element into an inoperative position by pivoting the optical element holder such that the optical element and the optical element holder do not affect an image viewable through the image forming optical system.

19. The method of claim 18, wherein the operations of placing the optical element into the operative position and placing the optical element into the inoperative position are performed using one hand.

20. The method of claim 18, wherein the optical element includes a refocus lens configured such that, when the optical element holder is in the operative position, the refocus lens substantially decreases a distance at which the image may be clearly viewed through the image forming optical system; wherein the method further includes, after the operation of placing the optical element into the operative position, viewing an object at a near distance; and wherein the method further includes, after the operation of placing the optical element into the inoperative position, viewing an object at a far distance.

* * * * *